(12) United States Patent
Growitz et al.

(10) Patent No.: US 11,403,652 B1
(45) Date of Patent: Aug. 2, 2022

(54) CUSTOMER-LEVEL LIFETIME VALUE

(71) Applicant: INTUIT INC., Mountain View, CA (US)

(72) Inventors: Aaron Growitz, Danville, CA (US); Brian Smith, Santa Clara, CA (US)

(73) Assignee: INTUIT, INC., Mountain View, CA (US)

( * ) Notice: Subject to any disclaimer, the term of this patent is extended or adjusted under 35 U.S.C. 154(b) by 259 days.

(21) Appl. No.: 16/124,395

(22) Filed: Sep. 7, 2018

(51) Int. Cl.
   *G06Q 30/02* (2012.01)
   *G06N 5/02* (2006.01)

(52) U.S. Cl.
   CPC ........... *G06Q 30/0202* (2013.01); *G06N 5/02* (2013.01)

(58) Field of Classification Search
   None
   See application file for complete search history.

(56) References Cited

U.S. PATENT DOCUMENTS

| | | | |
|---|---|---|---|
| 8,200,527 B1 * | 6/2012 | Thompson | G06Q 10/06398 705/7.39 |
| 8,311,863 B1 * | 11/2012 | Kemp | G06Q 10/0639 705/7.11 |
| 10,235,628 B1 * | 3/2019 | Merritt | G06N 5/022 |
| 10,417,650 B1 * | 9/2019 | Gong | G06Q 30/0202 |
| 2008/0147485 A1 * | 6/2008 | Osagami | G06Q 30/0202 705/7.31 |
| 2009/0319344 A1 * | 12/2009 | Tepper | G06Q 10/06393 705/7.39 |
| 2013/0173337 A1 * | 7/2013 | Evans | G06Q 30/02 705/7.29 |
| 2014/0280811 A1 * | 9/2014 | Bealkowski | H04L 41/0663 709/223 |
| 2015/0186915 A1 * | 7/2015 | Steckler | G06Q 30/0226 705/14.27 |
| 2016/0012465 A1 * | 1/2016 | Sharp | G06Q 20/10 705/14.17 |

(Continued)

OTHER PUBLICATIONS

Chamberlain et al., "Customer Lifetime Value Prediction Using Embeddings", KDD'17: Proceedings of the 23rd ACM SIGKDD International Conference on Knowledge Discovery and Data Mining, Aug. 2017 pp. 1753-1762 (Year: 2017).*

(Continued)

*Primary Examiner* — Thomas L Mansfield
(74) *Attorney, Agent, or Firm* — Patterson & Sheridan, LLP

(57) ABSTRACT

Certain aspects of the present disclosure provide techniques for providing detailed customer-level lifetime value data via a user interface. Embodiments include receiving customer data related to a customer. Embodiments include using a plurality of predictive models to predict, based on the customer data, values for a plurality of sub-components of a lifetime value of the customer, wherein each predictive model of the plurality of predictive models corresponds to a sub-component of the sub-components. Embodiments include determining customer-level lifetime value data for the customer by aggregating the values for the plurality of sub-components. Embodiments include providing the customer-level lifetime value data for the customer, including a subset of the values for the sub-components, to an application for display to a user via the user interface.

20 Claims, 5 Drawing Sheets

(56) References Cited

U.S. PATENT DOCUMENTS

2016/0247173 A1* 8/2016 Manoharan ........ G06Q 30/0202
2018/0218383 A1* 8/2018 Shen .................. G06Q 30/0277

OTHER PUBLICATIONS

Cheng, C-J., et al. "Customer lifetime value prediction by a Markov chain based data mining model: Application to an auto repair and maintenance company in Taiwan." Scientia Iranica 19.3 (2012): 849-855. (Year: 2012).*

* cited by examiner

(12) United States Patent
US 11,403,652 B1

CUSTOMER-LEVEL LIFETIME VALUE

INTRODUCTION

Aspects of the present disclosure relate to techniques for determining customer-level lifetime values. In particular, embodiments described herein involve using predictive models to determine lifetime value data for customers at a sub-component level for display via user interfaces.

BACKGROUND

A lifetime value generally refers to a prediction of the net profit attributed to the entire future relationship of a business with a customer. Businesses often use lifetime value information to make financial decisions, such as marketing and product decisions. A lifetime value is an important number because it generally determines an upper limit on spending to acquire a new customer.

A customer's lifetime value is sometimes determined based on historical lifetime value data from customers. For example, the net profit attributed to relationships with historical customers may be averaged to predict a lifetime value for a new customer. While these types of predicted lifetime values may be useful at a high level, such as in determining how much should be spent to acquire new customers in general, it is not as helpful in making low-level decisions, such as how much to spend on a particular advertising keyword or whether to offer a particular promotion to a certain segment of customers.

Accordingly, there is a need for techniques of providing users with lifetime vale data that is more targeted, detailed, and granular.

BRIEF SUMMARY

Certain embodiments provide a method for providing detailed customer-level lifetime value data via a user interface. The method generally includes receiving customer data related to a customer; using a plurality of predictive models to predict, based on the customer data, values for a plurality of sub-components of a lifetime value of the customer, wherein each predictive model of the plurality of predictive models corresponds to a sub-component of the sub-components; determining customer-level lifetime value data for the customer by aggregating the values for the plurality of sub-components; and providing the customer-level lifetime value data for the customer, including a subset of the values for the sub-components, to an application for display to a user via the user interface.

Other embodiments provide a non-transitory computer-readable medium comprising instructions that, when executed by one or more processors, cause the one or more processors to perform a method for providing detailed customer-level lifetime value data via a user interface. The method generally includes receiving customer data related to a customer; using a plurality of predictive models to predict, based on the customer data, values for a plurality of sub-components of a lifetime value of the customer, wherein each predictive model of the plurality of predictive models corresponds to a sub-component of the sub-components; determining customer-level lifetime value data for the customer by aggregating the values for the plurality of sub-components; and providing the customer-level lifetime value data for the customer, including a subset of the values for the sub-components, to an application for display to a user via the user interface.

Other embodiments provide a system comprising one or more processors and a non-transitory computer-readable medium comprising instructions that, when executed by the one or more processors, cause the one or more processors to perform a method for providing detailed customer-level lifetime value data via a user interface. The method generally includes receiving customer data related to a customer; using a plurality of predictive models to predict, based on the customer data, values for a plurality of sub-components of a lifetime value of the customer, wherein each predictive model of the plurality of predictive models corresponds to a sub-component of the sub-components; determining customer-level lifetime value data for the customer by aggregating the values for the plurality of sub-components; and providing the customer-level lifetime value data for the customer, including a subset of the values for the sub-components, to an application for display to a user via the user interface.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
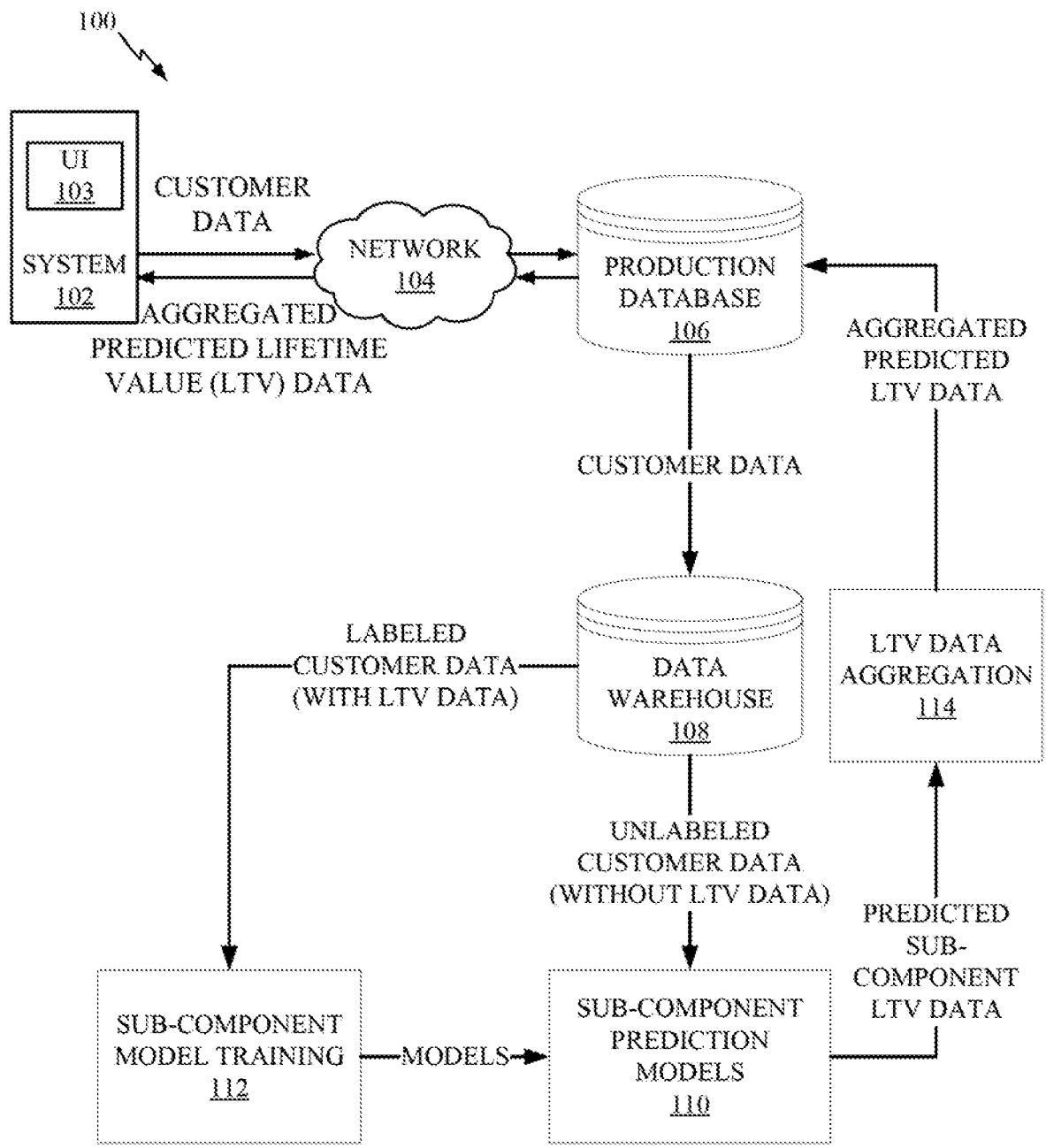
FIG. 1 depicts an example computing environment in which embodiments of the present disclosure may be implemented.

Aspects of the present disclosure provide apparatuses, methods, processing systems, and computer readable mediums for providing detailed customer-level lifetime value data via a user interface.

Lifetime Value (LTV) data is useful for a variety of purposes, such as in making marketing and promotional determinations for a product. Because high-level LTV data is of limited utility in making more granular decisions, such as determining whether to offer a particular promotion to a particular segment of customers, embodiments of the present disclosure involve determining detailed customer-level LTV data using predictive models that correspond to sub-components of LTV for customers, products, and/or services. For example, sub-components may include revenue (e.g., overall and/or associated with particular products, services, and/or segments of customers), propensity to attach (e.g., likelihood to purchase products and/or services), lifetime cost, retention, cost based on care utilization, credit card rates, and other factors that affect LTV. Each predictive model is trained based on historical data relating to a particular sub-component. For example, a predictive model for predicting revenue may be trained based on historical customer revenue data from a set of customers (e.g., all customers or a segment of customers that share common attributes, such as being located in a common geographic region) to forecast future revenue for a customer. Other sub-component models may be trained similarly. Sub-component data that is predicted for a customer by the various predictive models for sub-components is then aggregated to determine customer-level LTV data for the customer.

Customer-level LTV data is provided to a user via a user interface. In certain embodiments, the user interface allows the user to view data for individual sub-components of the customer's LTV, allowing for a more detailed and granular view of customer-level LTV data. The user may be provided with user interface controls, for example, that allow the user to specify options for viewing the LTV data, such as particular sub-components that the user is interested in viewing. In some embodiments, the user interface also allows the user to view product-level LTV data that is aggregated from the various sub-components of all or a subset of customers that use a particular product.

Techniques described herein constitute an improvement with respect to conventional industry practices, such as determining high-level LTV data that does not include sub-component data for individual customers, because they enable a more detailed understanding of LTV data at the customer level. Using predictive models that correspond to sub-components of a customer's LTV to predict sub-component data and then aggregate the sub-component data to determine customer-level LTV data improves the quality of LTV data, thereby improving the accuracy of decisions that are made based on LTV data. Providing detailed customer-level LTV data via a user interface in a manner that is customizable by users allows for the users to be provided with targeted, limited sets of data that are particularly useful to the users. Furthermore, providing a user with predicted customer-level LTV data with detailed information about individual LTV sub-components allows the user to ensure that the data "ties out" by checking high-level values (e.g., overall LTV) against sub-component values for consistency.

Example Computing Environment

FIG. 1 illustrates an example computing environment 100 in which embodiments of the present disclosure may be implemented.

Computing environment 100 includes production database 106, which receives customer data for a plurality of customers from a system 102. In certain embodiments, a portion of the received customer data includes customer identification data (e.g., customer name, geographic region, business type, length of time as a customer, and the like) associated with historical LTV data for the customers (e.g., values corresponding to sub-components of a customer's LTV, such as revenue, propensity to attach, lifetime cost, retention, cost based on care utilization, credit card rates, and other sub-components). This portion of customer data may be referred to as "labeled customer data". Another portion of the customer data may only include customer identification data without associated historical LTV data, and this portion may be referred to as "unlabeled customer data".

Network 104 may be any sort of data communication network capable of carrying customer data from user devices, such as system 102, to production database 106. For example, network 104 may be a local area network, wide area network, cellular network, ad-hoc network, near-field communication network, the Internet, or any other known or later developed network.

System 102 may represent one or more computing devices associated with a user (e.g., a business), and may collect customer data relating to the user's customers (e.g., from customer accounts and/or other business records). System 102 may comprise any form of electronic devices capable of running applications and communicating data over a network interface. For example, system 102 may include one or more servers, desktop computers, smartphones, tablet computers, laptop computers, smart wearable devices, autonomous or semi-autonomous vehicles, and other electronic devices. In some embodiments, system 102 provides labeled customer data to production database 106 so that the labeled customer data can be used to train prediction models that correspond to LTV sub-components, while unlabeled customer data is provided to production database 106 so that LTV data can be predicted, using the prediction models, based on the unlabeled customer data.

The customer data is stored in data warehouse 108. For example, a server hosting production database 106 may be configured for speed and thread capacity (e.g., to handle traffic from many users), whereas data warehouse 108 may be hosted by a server configured for storage capacity and resiliency.

In some examples, production database 106 may receive customer data from a user device, such as from system 102, at regular intervals (e.g., once a day) or continuously (e.g., while an application that captures customer data is running in the foreground or background on system 102). Alternatively, production database 106 may include an agent or other function that requests the customer data from remote applications, such as remote applications that may be installed on system 102.

The labeled customer data received by and stored in production database 106 (e.g., from system 102) may include "real-world" LTV data for various LTV sub-components. For example, labeled customer data for a certain customer may include customer identification information along with data about revenue generated from the customer, costs to maintain the customer (e.g., broken down into individual sources of costs, such as costs of providing support to the customer and costs of maintaining customer data), the customer's attachment data (e.g., products or services that the customer has purchased), the customer's retention data (e.g., whether or not the customer is retained in a given month), credit card rates for the customer, and the like. In certain embodiments, labeled customer data includes LTV data for customers on a monthly basis (e.g., for each month that a particular customer has been associated with the business).

In the depicted example, labeled customer data arriving at data warehouse 108 by way of production database 106 may be sent to sub-component model training module 112 for purposes of training sub-component prediction model(s) 110. In some examples, an agent of data warehouse 108 may automatically determine that newly received customer data is labeled with LTV data, and may thereafter send the labeled customer data to sub-component model training module 112. In other examples, sub-component model training module 112 may periodically or continuously send requests to data warehouse 108 for new customer data labeled with LTV data. In yet other examples, production database 106 may send customer data that is labeled with LTV data to sub-component model training module 112 directly as well as sending the same customer data to data warehouse 108.

Sub-component model training module 112 is used to train sub-component prediction models 110 based on, for example, labeled customer data. Thus, sub-component model training module 112 may perform, at least in part, supervised machine learning techniques to create sub-component prediction models 110, which may comprise a plurality of prediction models, each prediction model associated with a particular LTV sub-component. The labeled customer data is therefore an input to a machine learning process that trains sub-component prediction models 110. For example, customer data that is labeled with LTV data for a particular sub-component (e.g., revenue) is used to train a sub-component prediction model for that particular sub-component. Subsequently, unlabeled customer data is provided as input to the prediction model for the particular sub-component, and the prediction model outputs predicted LTV data for that particular sub-component (e.g., a forecasted revenue for the customer on a monthly basis for the predicted lifetime of the customer).

LTV sub-component data predicted by sub-component prediction models 110 is aggregated by LTV data aggregation component 114 to produce aggregated predicted LTV data. For example, LTV data aggregation component 114 may group LTV sub-component data that corresponds to a particular customer into customer-level LTV data for the customer (e.g., including a calculation of an overall LTV for the customer and the data for each sub-component). The aggregated predicted LTV data is sent back to production database 106 so that it may be subsequently transmitted back to a user as predicted customer-level LTV data, such as back to a user interface 103 of an application running on system 102. In some embodiments, user interface 103 provides one or more controls allowing the user to customize options for viewing predicted customer-level LTV data, such as which sub-components to display, which customer, product, or service the user wants to view LTV data for, and other options.

Sub-component prediction models 110 receive unlabeled customer data as input from data warehouse 108 and output predicted LTV data for various sub-components. In some examples, sub-component prediction models 110 comprise one or more different types of models, such as a time series forecasting model, decision tree, random forest, logistic regression, gradient-boosted tree, multilayer perceptron, and others. Time series forecasting involves the use of a model to predict future values based on previously observed values that were taken at regular successive points in time (e.g., monthly). A decision tree makes a classification by dividing inputs into smaller classifications (at nodes), which result in an ultimate classification at a leaf. A random forest extends the concept of a decision tree model, except the nodes included in any give decision tree within the forest are selected with some randomness. Thus, random forests may reduce bias and group outcomes based upon the most likely positive responses. Gradient boosting is a method for optimizing decision-tree based models.

In some embodiments, sub-component prediction models 110 are implemented using a parallel processing architecture such as APACHE SPARK™, which is an open-source cluster-computing framework for performing parallel processing. For example, the sub-component prediction models and/or other components associated with techniques described herein may be distributed over a cluster of computing entities in a fault-tolerant manner so that predictions may be determined efficiently and reliably. This allows for increased efficiency, especially for businesses that have a large customer-base, as the (potentially significant) processing involved in making sub-component LTV predictions is distributed across multiple processing components.

Sub-component model training module 112 may continuously retrain sub-component prediction models 110 based on new or updated labeled customer data received from data warehouse 108. For example system 102 may regularly capture actual LTV data for customers, such as on a monthly basis, and the actual LTV data may continuously be received by production database 106 and data warehouse 108 as labeled customer data, as described above. This continuous up-to-date labeled customer data is used by sub-component model training module 112 to re-train and thereby improve the accuracy of sub-component prediction models 110 on an ongoing basis.

In some cases, one or more of production database 106, data warehouse 108, LTV data aggregation module 114, sub-component predictive models 110, and sub-component model training module 112 may be resident, individually or collectively, on one or more servers. For example, in some cases production database 106 is resident on an external network facing server, while data warehouse 108 is on a non-externally accessible server. Further, sub-component model training module 112 and sub-component predictive models 110 may be resident on special-purpose, high-performance servers in data communication with production database 106 and data warehouse 108. In alternative embodiments, functionality described with respect to system 102, production database 106, data warehouse 108, LTV data aggregation module 114, sub-component predictive models 110, and sub-component model training module 112 may be implemented within a single entity or a plurality of local or distributed components.

Notably FIG. 1 is depicted with a selected group of features for clarity and simplicity, but there may be many additional elements of computing environment 100. For example, production database 106 may be behind a firewall and accessible only via a gateway or application programming interface (API).

Computing environment 100 has many uses, including, for example, predicting and providing detailed customer-level LTV data, including data corresponding to individual LTV sub-components, in a customizable manner to a user via user interface 103. As discussed above, this allows users to gain a more thorough and granular understanding of LTV data, and thereby make more informed decisions with respect to matters that are related to LTV. Providing users with predicted LTV data at the sub-component level further allows users to verify that predicted LTV data ties out, such as for auditing purposes, thereby improving the users' confidence in the predictions.

The predicted LTV data generated by computing environment 100 may be useful for marketing determinations (e.g., whether to market certain products or services to certain segments of customers, what sorts of keywords to use in advertising, whether to offer a certain promotion or price adjustment, revenue based AB testing, and other determinations). For example, customer identification information in both labeled and unlabeled customer data may indicate whether or not customers have been offered a particular promotion. For instance, labeled customer data that indicates whether customers have been offered the particular promotion (e.g., labeled with data indicating the customers' attachments after being offered the promotion) is therefore used to train a particular sub-component model. As such, the sub-component models are trained to predict sub-component values for customers based on whether the customers have been offered the particular promotion. Analyzing predicted LTV data at the sub-component level for these customers allows a user to determine the predicted effects on sub-components of offering the particular promotion to a given customer. For example, the predicted effects of the promotion on a customer's propensity to attach may be of interest in determining whether to offer the promotion.

The predicted LTV data generated by computing environment 100 may also be used to improve the sub-component prediction models 110 because the predictions can be compared to actual LTV data as it is subsequently determined (e.g., on a monthly basis) to determine the accuracy of the predictions. Improvements could include, for example, re-prioritizing the criteria used for predicting LTV data by a particular sub-component model. For example, if LTV data predicted for a sub-component using a particular criteria (e.g., predictions that are based on historical LTV data associated with a certain aspect of customer identification information, such as geographic location) is determined to be frequently inaccurate based on subsequent actual LTV data for the sub-component, sub-component model training module 112 may use that determination as an input for training sub-component prediction models 110, which may result in the particular criteria (e.g., geographic location) no longer being used or being used less frequently for predicting LTV data for the sub-component.

Example Data Flow

Figure 2:
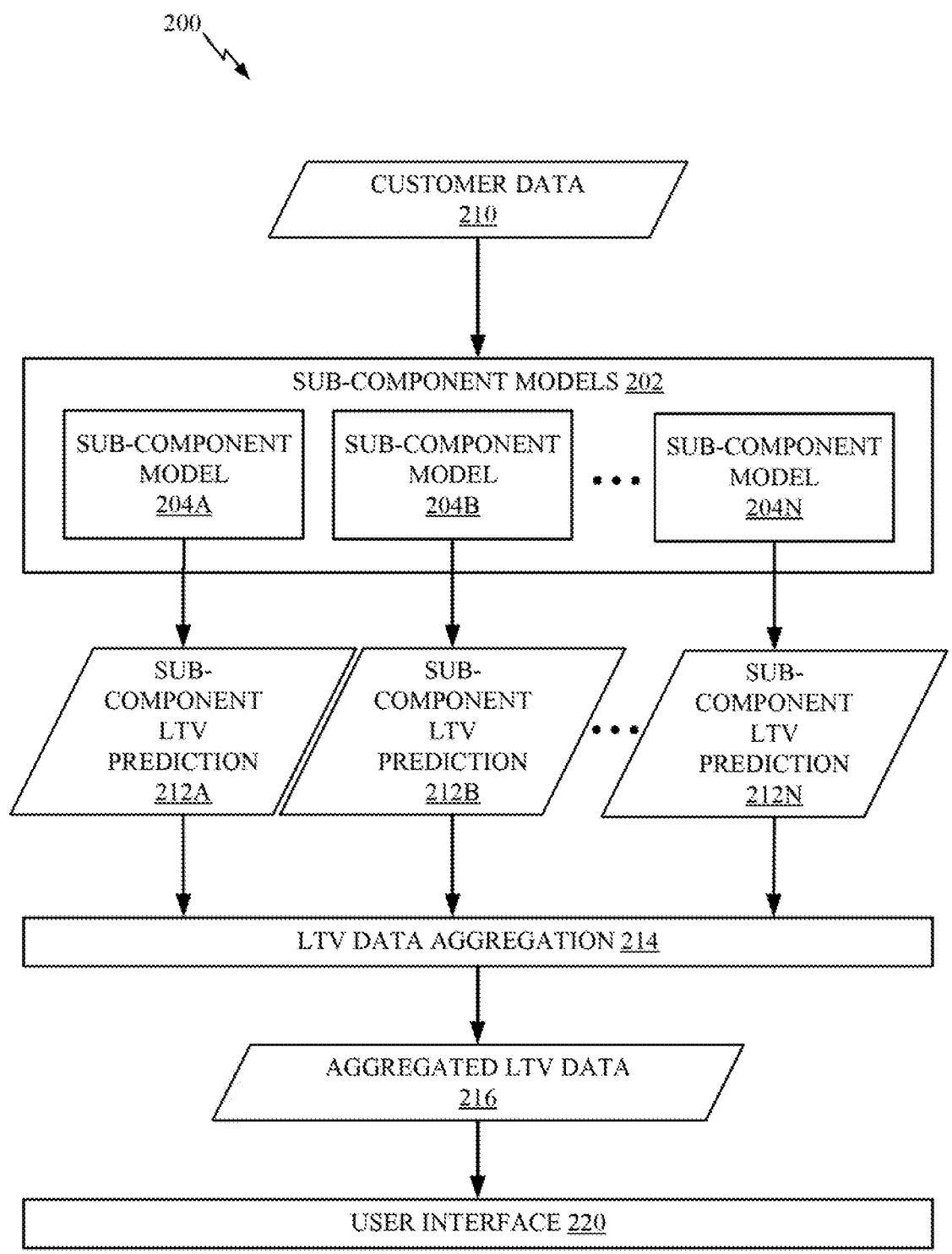
FIG. 2 depicts an example of determining detailed customer-level lifetime value data and providing the data via a user interface.

FIG. 2 depicts an example data flow 200 for determining detailed customer-level lifetime value data based on customer data and providing the detailed customer-level lifetime value data to a user via a user interface.

Customer data 210 generally comprises unlabeled customer data, such as customer identification information without associated LTV data. Customer data 210 is received by sub-component models 202, such as from data warehouse 108 of FIG. 1. Customer data 210 is provided as input to each of sub-component models 204A-N, each of which has been trained to predict LTV data for a particular sub-component based on labeled customer data related to the particular sub-component, as described above with respect to FIG. 1.

Sub-component models 204A-204N output sub-component LTV predictions 212A-N, each of which may comprise a series of predictions related to a particular sub-component at regular intervals, such as monthly, for the lifetime of the customer (e.g., indefinitely). In some embodiments, predictions are made on a monthly basis up to a certain future point (e.g., a predefined number of months or years), after which a single value (e.g., the last predicted monthly value or an average monthly value) is repeated into perpetuity. In some embodiments, a dependency chain may exist among sub-component models 204A-204N. For example, predictions made by one sub-component prediction model 212N (e.g., corresponding to overall revenue for the customer) may depend upon the output of another sub-component prediction model 212B (e.g., corresponding to propensity to attach). For example, predicted total revenue for a customer may depend upon the products or services that the customer is predicted to purchase, which may be determined based on the customer's predicted propensity to attach.

Sub-component LTV predictions 212A-N are aggregated by LTV data aggregation module 214 to produce aggregated LTV data 216. In some embodiments, aggregation involves calculating an overall LTV for the customer that is identified by customer data 210 (e.g., using a predetermined formula based on the various sub-component LTV predictions 212A-N, which may involve subtracting a total cost from a total revenue) and combining the overall LTV with sub-component LTV predictions 212A-N to provide a detailed view of customer-level LTV.

Aggregated LTV data 216 is provided to user interface 220. For example, user interface 220 may be associated with an application running on a system used by a business to track and review data related to the business' customers, such as system 102 of FIG. 1. In some embodiments, user interface 220 displays aggregated LTV data 216 according to options specified by a user. User interface 220 may allow the user to modify the options in order to view different aspects of aggregated LTV data 216 (e.g., different combinations of sub-components) or to view aggregated LTV data 216 in different formats (e.g., numbers, charts, graphs, and/or the like).

Example User Interface

Figure 3:
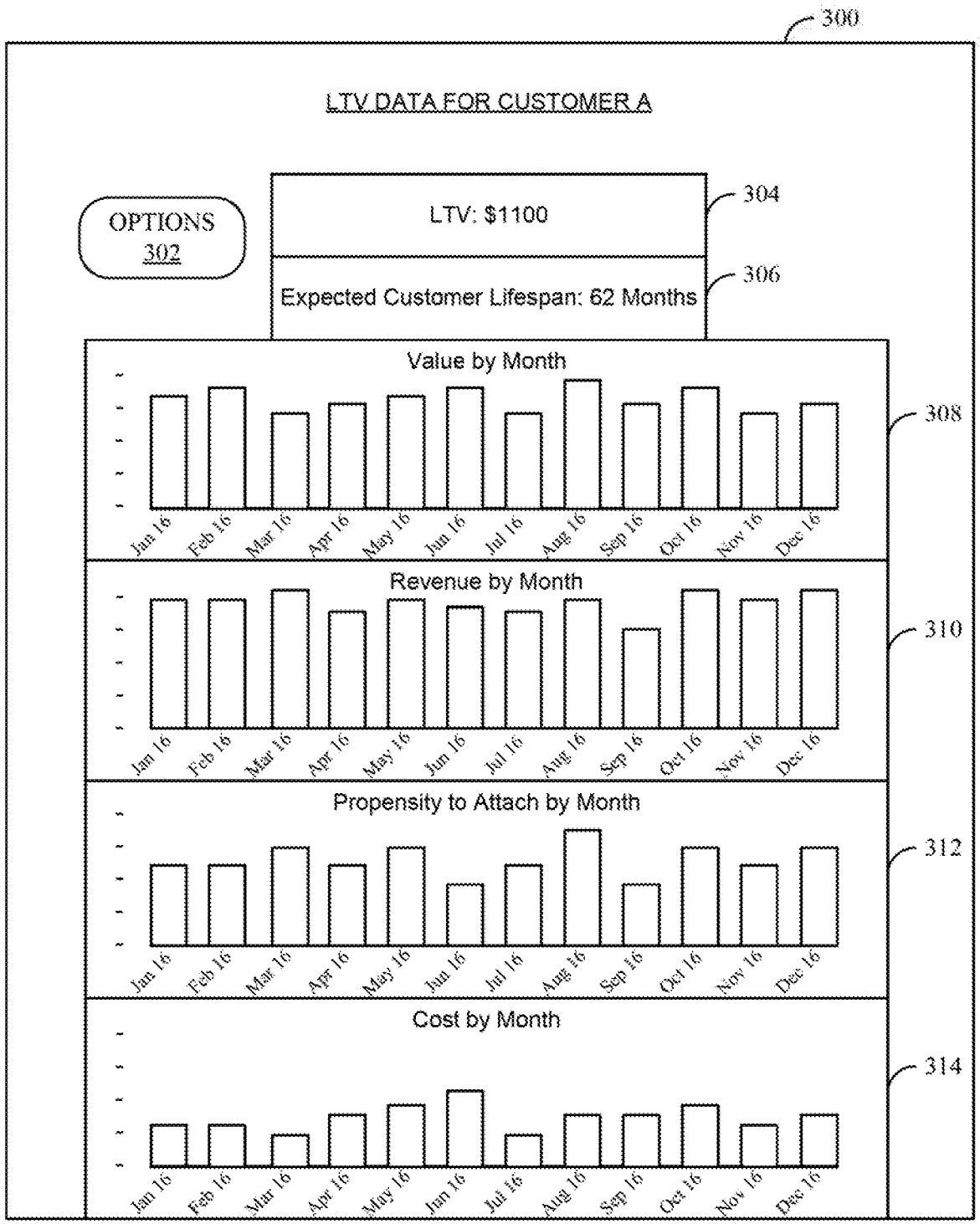
FIG. 3 depicts an example user interface for providing detailed customer-level lifetime value data.

FIG. 3 depicts an example user interface 300 for providing detailed customer-level LTV data. For example, user interface 300 may be representative of user interface 220 of FIG. 2, and may be associated with system 102 of FIG. 1. It is noted that the elements shown and described with respect to user interface 300 are only included as examples and fewer, additional, or different elements may alternatively be included. For example, while user interface 300 depicts LTV data for "CUSTOMER A", user interface 300 may alternatively depict LTV data for a set of customers or for a product or a service.

User interface 300 includes options 302, which may expose one or more user interface controls for specifying options related to the display of LTV data. For example, options 302 may be a button that, when selected, opens a panel allowing a user to specify options. In other examples, the various options may all be displayed in user interface 300 (e.g., in a sidebar) to be selected or deselected by the user. Options 302 may include, for example, which sub-components to display and a format for displaying data (e.g., a format for displaying all LTV data or individual sub-components).

User interface 300 includes an overall LTV 304, which comprises the overall predicted LTV for "CUSTOMER A". User interface 300 further includes an expected customer lifespan 306, which comprises an amount of time that the customer is predicted to remain a customer. User interface 300 further includes value by month 308, which comprises a monthly prediction of the value of the customer. Value by month 308 may, for example, be determined at least in part by subtracting the predicted costs for the customer from the predicted revenue for the customer on a monthly basis. User interface 300 further includes revenue by month 310, propensity to attach by month 312, and cost by month 314. While elements 308-314 are depicted as bar graphs, it is noted that the data may displayed in a variety of formats. For example, the user may have specified via options 302 that these elements should be displayed as bar graphs. Furthermore, each of elements 308-314 may allow the user to scroll to view additional monthly predictions, such as into perpetuity or for the expected customer lifespan.

The data shown in user interface 300 may regularly be updated as new predictions are output by the sub-component prediction models. For example, as actual LTV data for the various sub-components is received (e.g., on a monthly basis), the actual LTV data is used to re-train the sub-component prediction models, after which new predictions may be generated for the various sub-components and aggregated for display in user interface 300.

The ability to see the detailed LTV data in user interface 300 allows a user to verify that the data ties out (e.g., is accurate and consistent), such as by comparing overall LTV 304 to the values for revenue by month 310 and cost by month 314, among other sub-components. Options 302 allow the user to customize the data displayed in user interface 300 for a more targeted and granular understanding of the LTV data, which allows for better decision-making based on the LTV data.

Figure 4:
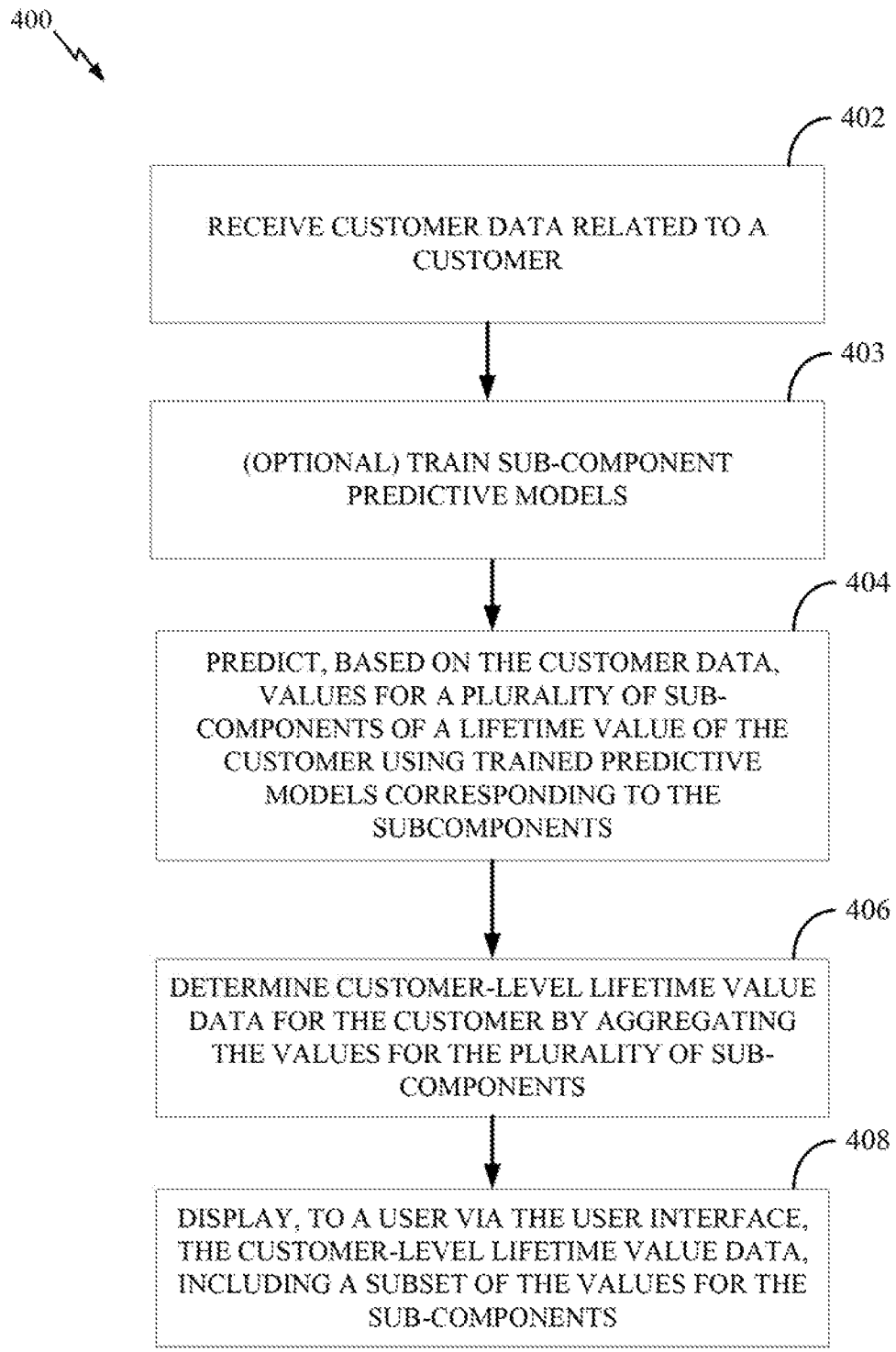
FIG. 4 depicts example operations for providing detailed customer-level lifetime value data via a user interface.

FIG. 4 depicts example operations 400 for providing detailed customer-level lifetime value data via a user interface. For example, operations 400 may be performed by one or more components of computing environment 100 of FIG. 1.

At step 402, customer data related to a customer is received. In one example, the customer data is unlabeled customer data that comprises customer identification information, and is received from a system or database, such as data warehouse 108 of FIG. 1.

At step 403, sub-component predictive models are optionally trained. For example, if a portion of customer data comprises labeled customer data relating to one or more sub-components, then the labeled customer data is used to train the predictive models corresponding to the one or more sub-components.

At step 404, values for a plurality of sub-components of LTV are predicted for the customer based on the customer data (e.g., unlabeled customer data) using trained predictive models corresponding to the sub-components. For example, each predictive model for a particular sub-component predicts future monthly values for the particular sub-component based on the input unlabeled customer data.

At step 406, customer-level LTV data is determined for the customer by aggregating the values for the plurality of sub-components. For example, an overall LTV for the customer is calculated according to a predetermined formula based on the values for the sub-components and is combined with the values for the sub-components to provide a detailed view of the customer's LTV.

At step 408, the customer-level LTV data for the customer is displayed to a user via a user interface, including a subset of the values for the sub-components. For example, in some embodiments, the subset is specified by the user via options.

It is noted that operations 400 are only included as an example, and other sets of operations may be performed without departing from the scope of the present disclosure.

Though not depicted, method 400 may further include receiving, from the user and via the user interface, a request to view the customer-level lifetime value for the customer, (e.g., the request identifying the subset of the values for the sub-components) and displaying the subset of the values for the sub-components based on the request. For example, the user interface may be associated with an application, and the application may request the customer-level lifetime value for the customer, including the subset of the values for the sub-components, from production database 106 of FIG. 1. In response, production database 106 may provide the customer-level lifetime value for the customer, including the subset of the values for the sub-components, to the application, based on the request, for display to the user via the user interface.

Though not depicted, the customer data of method 400 may comprise customer identification information, including attributes of the customer, such as a customer's name, geographic location, size, business type, and length of time as a customer. In certain embodiments, the customer data of method 400 may comprise labeled customer data that includes historical LTV data associated with customer identification information. The historical customer data (e.g., historical LTV data associated with customer identification information for a plurality of customers) for each sub-component of the sub-components may comprise historical attributes of a plurality of customers and historical values for the sub-component related to the plurality of users. Using the plurality of predictive models to predict, based on the customer data, the values for the plurality of sub-components of the lifetime value of the customer may further include providing the attributes of the customer as inputs to the plurality of predictive models and receiving the values for the plurality of sub-components as outputs from the plurality of predictive models.

Though not depicted, method 400 may further include receiving an actual value for a sub-component of the plurality of sub-components of the lifetime value of the customer and using the actual value for the sub-component to re-train a predictive model of the plurality of predictive models that corresponds to the sub-component.

Though not depicted, method 400 may further include using the predictive model of the plurality of predictive models that corresponds to the sub-component to predict an updated value for the sub-component and updating the customer-level lifetime value data for the customer based on the updated value for the sub-component.

Though not depicted, method 400 may further include determining product-level lifetime value data for a product by aggregating one or more values of the values for the sub-components with additional sub-component data related to one or more additional customers (e.g., other customers that use the product) and displaying, to the user via the user interface, the product-level lifetime value data. In some embodiments, the one or more values are related to the product, and aggregating the one or more values of the values for the sub-components with the additional sub-component data related to the one or more additional customers comprises identifying the additional sub-component data based on the product. For example, the user may request, via the user interface of the application, to view product-level lifetime value data for a product identified in the request. The application may then request the product-level lifetime value data for the product from production database 106 of FIG. 1. In response, production database 106 may determine and provide the product-level lifetime value data for the product to the application, based on the request, for display to the user via the user interface.

In some examples, an apparatus, including a memory comprising executable instructions and a processor in data communication with the memory and configured to execute the executable instructions, may be configured to cause the apparatus to perform a method for providing detailed customer-level lifetime value data via a user interface, such as method 400 (or any combination of the steps described above with respect to method 400).

In some examples, a non-transitory computer-readable medium comprising instructions that when executed by a processor of an apparatus cause the apparatus to perform a method for providing detailed customer-level lifetime value data via a user interface, such as method 400 (or any combination of the steps described above with respect to method 400).

Example Computing Systems

Figure 5A:
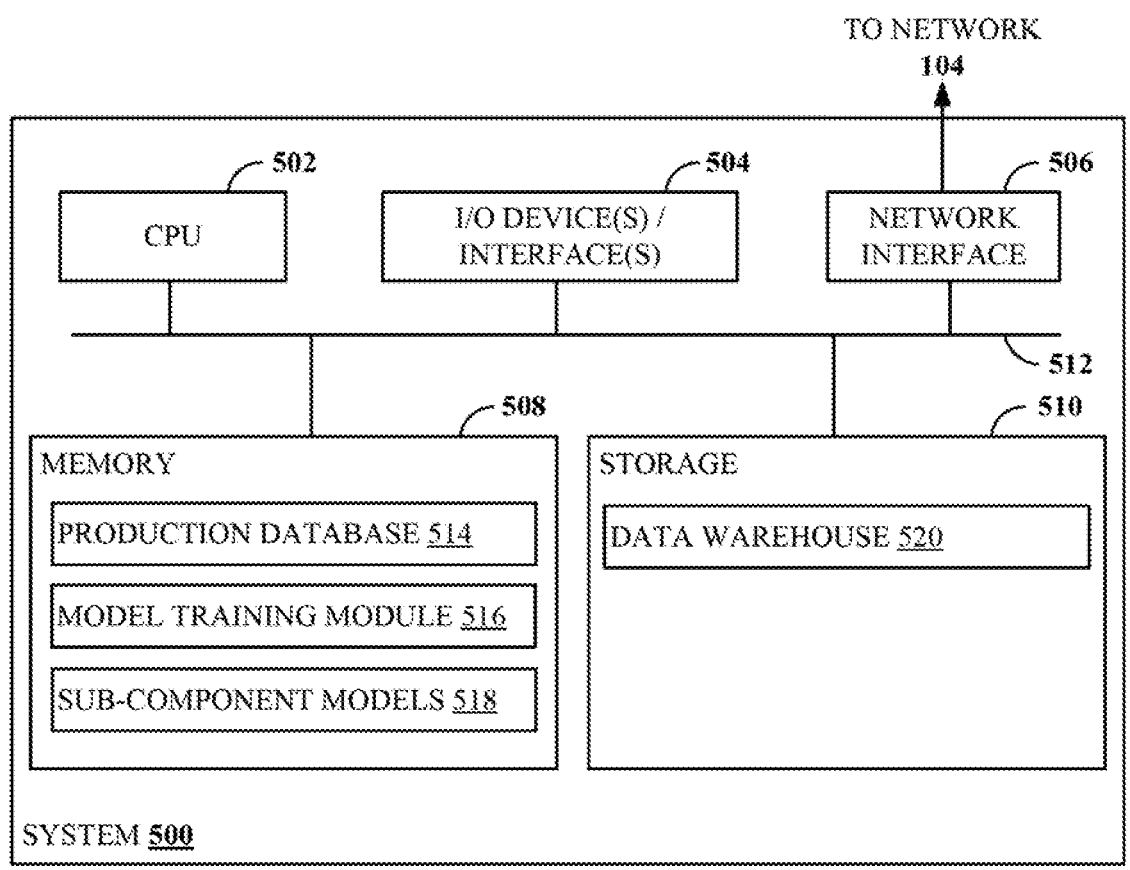
FIGS. 5A and 5B depict example computer systems with which embodiments of the present disclosure may be implemented.
Figure 5B:
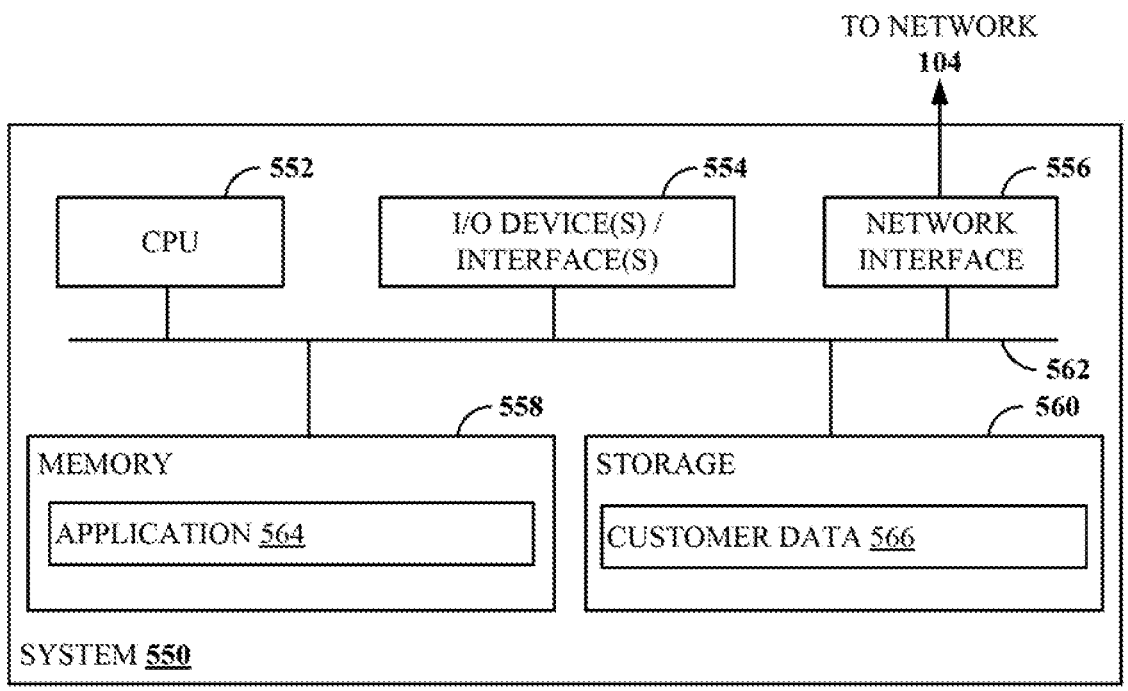

FIGS. 5A and 5B illustrate example systems 500 and 550 used for providing detailed customer-level lifetime value data via a user interface.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises data warehouse 520, which may be representative of data warehouse 108 of FIG. 1. While data warehouse 520 is depicted in local storage of system 500, it is noted that data warehouse 520 may also be located remotely (e.g., at a location accessible over a network, such as the Internet).

As shown, memory 508 includes production database 514, model training module 516, and sub-component models 518, which may be representative of production database 106, sub-component model training module 112, and sub-component prediction models 110 of FIG. 1. Each of these components may alternatively be located remotely.

As shown, system 550 includes a central processing unit (CPU) 552, one or more I/O device interfaces 554 that may allow for the connection of various I/O devices 554 (e.g., keyboards, displays, mouse devices, pen input, etc.) to the system 550, network interface 556, a memory 558, storage 560, and an interconnect 562. It is contemplated that one or more components of system 550 may be located remotely and accessed via a network. It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 562 transmits programming instructions and application data, among the CPU 552, I/O device interface 554, network interface 556, memory 558, and storage 560. CPU 552 is included to be representative of a single CPU, multiple CPUs, a single CPU having multiple processing cores, and other arrangements. Additionally, the memory 558 is included to be representative of a random access memory. Furthermore, the storage 560 may be a disk drive, solid state drive, or a collection of storage devices distributed across multiple storage systems. Although shown as a single unit, the storage 560 may be a combination of fixed and/or removable storage devices, such as fixed disc drives, removable memory cards or optical storage, network attached storage (NAS), or a storage area-network (SAN).

Storage 560 comprises customer data 566, which may be representative of data labeled and unlabeled customer data as described with respect to FIGS. 1-4. While customer data 566 is depicted in local storage of system 550, it is noted that customer data 566 may also be located remotely (e.g., at a location accessible over a network, such as the Internet).

As shown, memory 558 includes an application 564, which may be representative of a software application through which a user of system 550 accesses a user interface, such as UI 103 of FIG. 1. For example, a user may access customer-level LTV data via application 564. Application 564 may alternatively be located remotely.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing detailed customer-level lifetime value data via a user interface, comprising:
   receiving customer data related to a customer;
   using a plurality of predictive models to predict, based on the customer data, values for a plurality of sub-components of a lifetime value of the customer, wherein:
      each predictive model of the plurality of predictive models corresponds to a sub-component of the plurality of sub-components;
      the plurality of predictive models are trained using actual lifetime value data of a plurality of customers;
      the values for the plurality of sub-components of the lifetime value of the customer are predicted using the plurality of predictive models via a parallel processing architecture for improved processing efficiency; and
      the plurality of predictive models are distributed over a cluster of computing entities in a fault-tolerant manner for improved reliability;
   determining customer-level lifetime value data for the customer by aggregating the values for the plurality of sub-components;
   receiving, from an application, a request for customer-level lifetime value for the customer, wherein the request identifies a subset of the values for the sub-components that a user selected, via interaction with one or more user interface controls for customizing lifetime value viewing options, to view; and
   providing, in response to the request, the customer-level lifetime value data for the customer, including the subset of the values for the plurality of sub-components, to the application for display to the user via the user interface.

2. The method of claim 1, wherein a sub-component of the plurality of sub-components comprises revenue, and wherein using the plurality of predictive models to predict, based on the customer data, the values for the plurality of sub-components comprises predicting revenue for the customer on a monthly basis for a predicted lifetime of the customer.

3. The method of claim 1, further comprising:
   receiving an actual value for a sub-component of the plurality of sub-components of the lifetime value of the customer; and
   using the actual value for the sub-component to re-train a predictive model of the plurality of predictive models that corresponds to the sub-component;
   using the predictive model of the plurality of predictive models that corresponds to the sub-component to predict an updated value for the sub-component; and
   determining updated customer-level lifetime value data for the customer by aggregating the updated value for the sub-component with values for other sub-components of the plurality of sub-components.

4. The method of claim 1, further comprising:
   receiving an additional request from the application for product-level lifetime value data, the request identifying a product;
   determining product-level lifetime value data for the product, based on the additional request, by aggregating one or more values of the values for the sub-components with additional sub-component data related to one or more additional customers; and
   providing the product-level lifetime value data for the product to the application for display via the user interface.

5. The method of claim 4, wherein the one or more values of the values for the sub-components are related to the product, and wherein aggregating the one or more values of the values for the sub-components with the additional sub-component data related to the one or more additional customers comprises identifying the additional sub-component data based on the product.

6. The method of claim 1, wherein a dependency chain exists among the plurality of predictive models, and wherein using the plurality of predictive models to predict, based on the customer data, the values for the plurality of sub-components comprises:
   providing the customer data as input to a first predictive model of the plurality of predictive models;
   receiving an output from the first predictive model; and
   providing the output from the first predictive model as an input to a second predictive model of the plurality of predictive models.

7. A non-transitory computer-readable medium comprising instructions that, when executed by one or more processors of a computing system, cause the computing system to perform a method for providing detailed customer-level lifetime value data via a user interface, the method comprising:
   receiving customer data related to a customer;
   using a plurality of predictive models to predict, based on the customer data, values for a plurality of sub-components of a lifetime value of the customer, wherein:
      each predictive model of the plurality of predictive models corresponds to a sub-component of the plurality of sub-components;
      the plurality of predictive models are trained using actual lifetime value data of a plurality of customers;
      the values for the plurality of sub-components of the lifetime value of the customer are predicted using the plurality of predictive models via a parallel processing architecture for improved processing efficiency; and
      the plurality of predictive models are distributed over a cluster of computing entities in a fault-tolerant manner for improved reliability;
   determining customer-level lifetime value data for the customer by aggregating the values for the plurality of sub-components;
   receiving, from an application, a request for customer-level lifetime value for the customer, wherein the request identifies a subset of the values for the sub-components that a user selected, via interaction with one or more user interface controls for customizing lifetime value viewing options, to view; and
   providing, in response to the request, the customer-level lifetime value data for the customer, including the subset of the values for the plurality of sub-components, to the application for display to the user via the user interface.

8. The non-transitory computer-readable medium of claim 7, wherein a sub-component of the plurality of sub-components comprises revenue, and wherein using the plurality of predictive models to predict, based on the customer data, the values for the plurality of sub-components comprises predicting revenue for the customer on a monthly basis for a predicted lifetime of the customer.

9. The non-transitory computer-readable medium of claim 7, wherein the method further comprises:
   receiving an actual value for a sub-component of the plurality of sub-components of the lifetime value of the customer; and using the actual value for the sub-component to re-train a predictive model of the plurality of predictive models that corresponds to the sub-component;

using the predictive model of the plurality of predictive models that corresponds to the sub-component to predict an updated value for the sub-component; and determining updated customer-level lifetime value data for the customer by aggregating the updated value for the sub-component with values for other sub-components of the plurality of sub-components.

10. The non-transitory computer-readable medium of claim 7, wherein the method further comprises:

receiving an additional request from the application for product-level lifetime value data, the request identifying a product;

determining product-level lifetime value data for the product, based on the additional request, by aggregating one or more values of the values for the sub-components with additional sub-component data related to one or more additional customers; and providing the product-level lifetime value data for the product to the application for display via the user interface.

11. The non-transitory computer-readable medium of claim 10, wherein the one or more values of the values for the sub-components are related to the product, and wherein aggregating the one or more values of the values for the sub-components with the additional sub-component data related to the one or more additional customers comprises identifying the additional sub-component data based on the product.

12. The non-transitory computer-readable medium of claim 7, wherein a dependency chain exists among the plurality of predictive models, and wherein using the plurality of predictive models to predict, based on the customer data, the values for the plurality of sub-components comprises:

providing the customer data as input to a first predictive model of the plurality of predictive models;

receiving an output from the first predictive model; and providing the output from the first predictive model as an input to a second predictive model of the plurality of predictive models.

13. A system, comprising one or more processors and a non-transitory computer-readable medium comprising instructions that, when executed by the one or more processors, cause the one or more processors to perform a method for providing detailed customer-level lifetime value data via a user interface, the method comprising:

receiving customer data related to a customer;

using a plurality of predictive models to predict, based on the customer data, values for a plurality of sub-components of a lifetime value of the customer, wherein:

each predictive model of the plurality of predictive models corresponds to a sub-component of the plurality of sub-components;

the plurality of predictive models are trained using actual lifetime value data of a plurality of customers;

the values for the plurality of sub-components of the lifetime value of the customer are predicted using the plurality of predictive models via a parallel processing architecture for improved processing efficiency; and the plurality of predictive models are distributed over a cluster of computing entities in a fault-tolerant manner for improved reliability;

determining customer-level lifetime value data for the customer by aggregating the values for the plurality of sub-components;

receiving, from an application, a request for customer-level lifetime value for the customer, wherein the request identifies a subset of the values for the sub-components that a user selected, via interaction with one or more user interface controls for customizing lifetime value viewing options, to view; and providing, in response to the request, the customer-level lifetime value data for the customer, including the subset of the values for the plurality of sub-components, to the application for display to the user via the user interface.

14. The system of claim 13, wherein a sub-component of the plurality of sub-components comprises revenue, and wherein using the plurality of predictive models to predict, based on the customer data, the values for the plurality of sub-components comprises predicting revenue for the customer on a monthly basis for a predicted lifetime of the customer.

15. The system of claim 13, wherein the method further comprises:

receiving an actual value for a sub-component of the plurality of sub-components of the lifetime value of the customer; and using the actual value for the sub-component to re-train a predictive model of the plurality of predictive models that corresponds to the sub-component;

using the predictive model of the plurality of predictive models that corresponds to the sub-component to predict an updated value for the sub-component; and determining updated customer-level lifetime value data for the customer by aggregating the updated value for the sub-component with values for other sub-components of the plurality of sub-components.

16. The system of claim 13, wherein the method further comprises:

receiving an additional request from the application for product-level lifetime value data, the request identifying a product;

determining product-level lifetime value data for the product, based on the additional request, by aggregating one or more values of the values for the sub-components with additional sub-component data related to one or more additional customers; and providing the product-level lifetime value data for the product to the application for display via the user interface.

17. The system of claim 16, wherein the one or more values of the values for the sub-components are related to the product, and wherein aggregating the one or more values of the values for the sub-components with the additional sub-component data related to the one or more additional customers comprises identifying the additional sub-component data based on the product.

18. The system of claim 13, wherein a second prediction made by a second predictive model of the plurality of predictive models is based on a first prediction made by a first predictive model of the plurality of predictive models.

19. The method of claim 1, wherein a second prediction made by a second predictive model of the plurality of predictive models is based on a first prediction made by a first predictive model of the plurality of predictive models.

20. The non-transitory computer-readable medium of claim 7, wherein a second prediction made by a second predictive model of the plurality of predictive models is based on a first prediction made by a first predictive model of the plurality of predictive models.

* * * * *